June 24, 1924.

R. E. BENOIST 1,498,715

LUGGAGE CARRIER FOR VEHICLES

Filed Aug. 16, 1922    2 Sheets-Sheet 1

Inventor:
Raymond E. Benoist.
By Fred'k Harrow
Attorney.

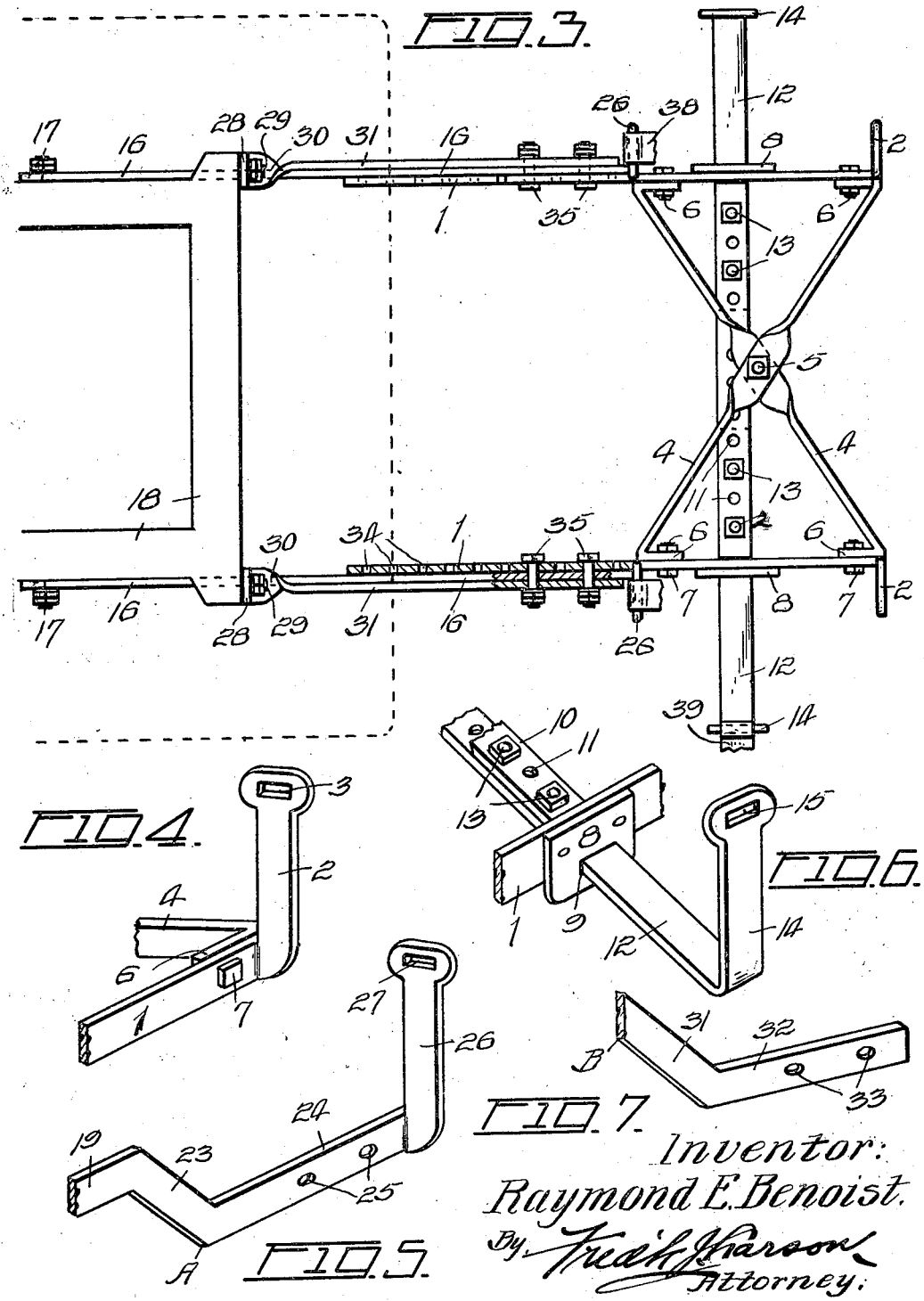

Patented June 24, 1924.

1,498,715

UNITED STATES PATENT OFFICE.

RAYMOND E. BENOIST, OF ST. LOUIS, MISSOURI.

LUGGAGE CARRIER FOR VEHICLES.

Application filed August 16, 1922. Serial No. 582,222.

*To all whom it may concern:*

Be it known that I, RAYMOND E. BENOIST, a citizen of the United States, residing in the city of St. Louis and State of Missouri, have invented certain new and useful Improvements in Luggage Carriers for Vehicles, of which the following is a specification.

This invention relates to luggage carriers for vehicles, and, more particularly to motor vehicles, and, is a distinct and practical improvement to overcome certain practical objections to, and defects in, the present types of luggage carriers.

The object of my invention is to provide a luggage carrier which will be simple in construction, easily and quickly applied to a vehicle chassis, or detached therefrom, and susceptible to quick adjustments for accommodating luggage, such as trunks or other luggage of various sizes.

A further object of the invention is to provide novel means for supporting the carrier to the rear of the vehicle.

A still further object of the invention is to provide a carrier which is composed of frame or carrier members capable of being readily assembled or disassembled so that all of its parts can be packed into a small bundle for transportation and sales purposes.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 3, is a plan view of the luggage carrier attached to a chassis frame.

Fig. 4, is a detail of a portion of one of the side frame members, its corner post and a portion of one of the cross-braces.

Fig. 5, is a detail of the rear end of one of the bracket members.

Fig. 6, is a detail showing one of the adjustable guide posts carried by the side frame members.

Fig. 7, is a detail showing the rear end of one of the supporting brackets.

Figure 1:
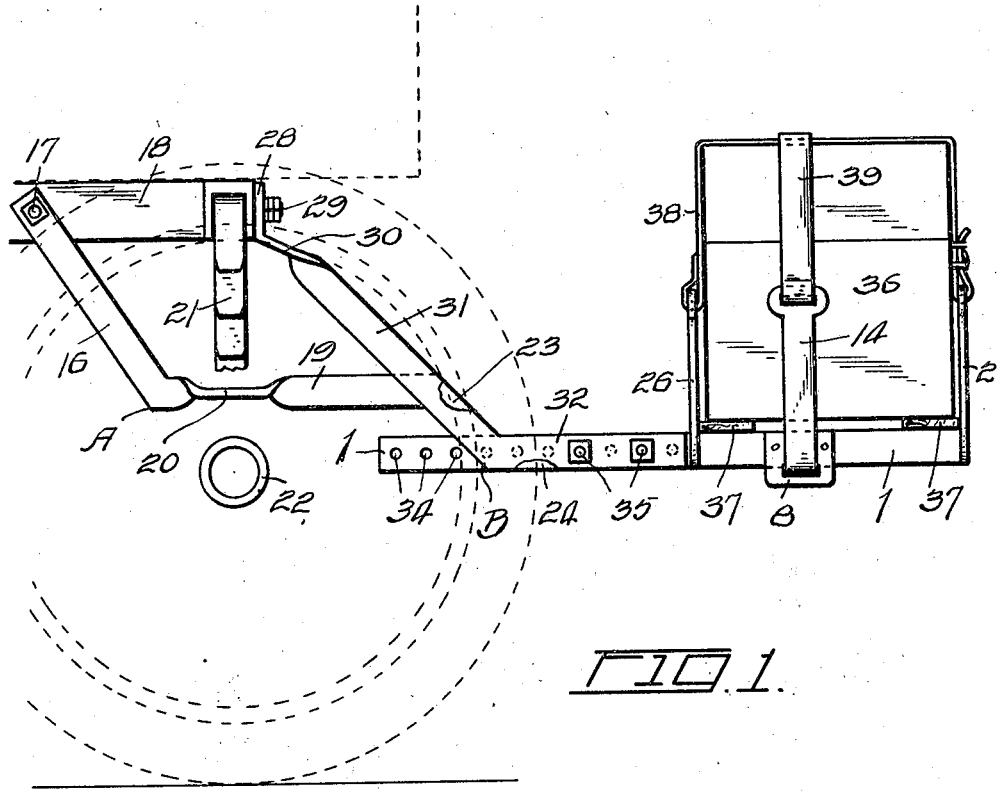
Fig. 1, is a side elevation of a luggage carrier embodying my invention and is shown as applied to a vehicle with a trunk supported by the carrier.
Figure 2:
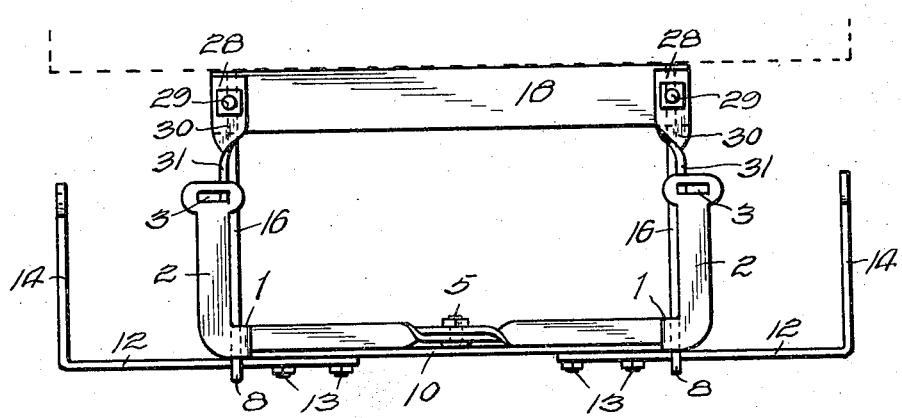
Fig. 2, is an end elevation thereof.

In carrying out the aim of my present invention, I employ a movable carrier frame structure comprising a pair of spaced parallel arranged frame members 1 preferably, although not necessarily made from strap-iron, each provided at its rear end with an upwardly directed post 2, each of which is provided with a strap receiving slot 3. Uniting the parallel frame members 1 at one end, are a pair of suitable brace members 4 which are removably united midway their ends by means of a bolt 5. The ends of the brace members 4 are bent toward each other to provide feet 6 which are removably connected to the parallel frame members 1 by means of bolts 7, as clearly shown in Figures 3 and 4.

An ear 8 provided with a slotted opening 9 is suitably fixed to and depends from each parallel frame member 1 at a suitable point in advance of the guide posts 2. Spanning the space between the two frame members 1 is a strap iron spacing member 10 having a plurality of bolt receiving openings 11 therein. A carrier frame member 12 is receivable in the slotted opening 9 of ear 8 and embraces the lower face of the spacing member 10. Each carrier frame member 12 is adjustably connected to the spacing member 10 by means of bolts 13 passing through the openings 11 of the spacing member 10, which permits of longitudinal adjustment of each carrier frame member 12. Each adjustable carrier frame member 12 is provided at its outer end with an upwardly directed post 14 having a slotted strap receiving opening 15 near its upper end.

The carrier frame structure heretofore described is adjustably supported by a suitable supporting bracket which will now be described.

A indicates a pair of angular brackets each comprising an angular disposed arm 16 removably fixed by means of a bolt 17 to the side sills of a chassis 18. A horizontally disposed arm 19 is directed rearwardly from the lower end of each angular disposed arm 16 and is provided with a twisted section 20 to lie at a right angle to the remainder of the arm 19, said twisted section 20 adapted to lie between the rear spring designated 21 and the housing designated 22 of the rear axle, especially in a motor vehicle structure equivalent to a Ford, where the rear spring lies transversely of the chassis. An angular arm section 23 is directed downwardly and rearwardly from each horizontally disposed arm section 19. Arm sections 23 terminate in a horizontally disposed arm section 24 having openings 25. This section 24 is adapted for embracing engagement with the outer face of each parallel carrier frame member 1, as clearly shown in Figure 3. Directed upwardly from the rear end of each arm section 24 of the supporting brackets A is a guide post 26 having a strap receiving opening 27 near its upper end.

A second pair of carrier frame supporting brackets designated B each comprise a foot 28 which is removably fixed to rear cross sill of the chassis frame by means of bolts 29. The lower end of each foot 28 is twisted, as at 30, and extending from this twisted section 30 is an angular disposed arm section 31 which is directed downwardly and rearwardly finally terminating in a horizontally disposed arm section 32 lying parallel with the carrier frame members 1 and arm sections 24 of supporting bracket A, as clearly shown in Fig. 3. The arm sections 32 of supporting brackets B embracingly engage the outer face of the arm sections 24 of the supporting brackets A. Arm sections 32 of brackets B are each provided with a pair of spaced bolt receiving openings 33 which register with the openings 25 of arm section 24 of bracket A when they are in their embracing position.

The parallel carrier frame members 1 are each provided with a plurality of bolt receiving openings 34 along their forward half, for the reception of bolts 35 which also pass through the registered openings 24 and 33 of the carrier frame supporting brackets A and B, respectively, for adjustably connecting the carrier frame members 1 to the supporting brackets A and B, which are stationary owing to their fixed relation to the chassis frame 17.

A trunk 36, tent or any desired luggage in bundle form, can be placed upon the carrier frame members 1, preferably between the posts 2, 14 and 26 and also preferably upon removable flooring 37, spanning the frame member 1, as shown in Fig. 1. The trunk, or other luggage is preferably strapped down by means of the straps 38 connecting each pair of guide posts 2 and 14 through the slotted openings 3 and 27, respectively, and the strap member 39 connecting the end guide posts 14 by means of the strap passing through the strap openings 15 of said posts. Luggage thus strapped down cannot be displaced over the roughest of roads and the entire carrier frame structure will remain rigid and in the adjusted position to accommodate the luggage carried thereby.

Where a smaller or larger bundle of luggage is to be carried by the carrier than shown in Fig. 1, the bolts 35 are removed from the parallel carrier frame members 1, moved forward or rearward, as the case may demand, with relation to the fixed supporting brackets A and B and the bolts are replaced in the openings 34 registering with the openings 25 and 33 of the supporting brackets A and B after the adjustment has been made, as is evident from Figures 1 and 3 of the drawings. This adjustment brings the guide posts 2 closer to the stationary guide posts 26, as is manifest. If it is desired to adjust the end guide posts 14 closer together or further apart, the bolts 13 are removed and passed through the desired openings 11 registering with the bolt receiving openings of the guide members 12.

It will thus be apparent from the foregoing description that the space between the guide posts can be widened or narrowed, and shortened or lengthened as the luggage to be carried thereby requires.

While I have shown the supporting bracket A in position between the rear spring 21 and the rear axle housing 22, it is only illustrative of its application to a Ford chassis, it being, of course, understood that on other makes of cars where the springs run longitudinally with the chassis instead of transversely thereof, that the relation of the bracket A to the rear springs will be different, hence on makes of cars other than Fords, the shape of the supporting bracket A can be modified to suit the occasion.

From the foregoing description, it is evident that I provide a luggage carrier which is built up of a series of frame and supporting members which can be readily assembled and united by means of bolts to establish a rigid and durable luggage carrier which will prove highly efficient for the purpose designed.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the form, shape and particular arrangement of parts without departing from the spirit of my invention, hence I reserve the right to make any such changes, or modifications as may fairly fall within the scope of the appended claims when fairly construed.

What I claim is:

1. A luggage carrier for vehicles embodying a luggage supporting frame, guide means for the luggage supported by said frame, securing means to prevent displacement of the luggage upon the supporting frame, supporting brackets fixed to and directed rearwardly from the chassis of the vehicle and means for adjustably connecting said luggage supporting frame to said supporting brackets.

2. In a luggage carrier, stationary brackets fixed to and directed downwardly and rearwardly from a chassis frame and a luggage supporting frame provided with guide posts adjustably supported by said brackets so that the luggage carrying section of the luggage supporting frame lies to the rear of said brackets.

3. The combination of a luggage carrier for vehicles comprising a luggage carrying frame consisting of parallel frame members having upturned ends, brace members crossing each other and having their ends removably connected to said parallel frame members at the rear ends thereof, a spacing member between said parallel frame members, adjustable post members supported by said parallel frame members and embracingly connected to said spacing member, a pair of supporting brackets fixed to a chassis frame and directed rearwardly therefrom, said brackets having their rear ends upturned and disposed opposite the upturned ends of said parallel luggage carrying frame members, a second pair of supporting brackets fixed to the chassis frame and directed rearward therefrom and means for adjustably connecting the forward ends of said parallel frame members to the rear ends of the aforesaid brackets for supporting said luggage carrying frame in fixed relation thereto.

4. An automobile luggage carrier comprising two parallel frame members, a guide post directed upwardly from the rear end of each frame member, cross-braces uniting said frame members at one end thereof, adjustable guide posts carried by said frame members, said posts being disposed to accommodate luggage therebetween and upon said frame members including the cross braces and supporting arms to which the forward ends of said frame members are adjustably connected, said supporting arms adapted to have their forward ends fixed to a chassis frame.

5. In a vehicle luggage carrier, a luggage supporting frame embodying a pair of parallel side frame members, a bracing frame uniting the side frame members at one end thereof, said frame members and bracing frame serving as a luggage supporting means, guide posts for said luggage supporting means, straps connecting said guide posts for retaining luggage thereupon from upward displacement, brackets adapted to be fixed to a chassis frame and directed rearwardly therefrom and means for adjustably connecting said luggage supporting means to the rear of said brackets.

6. In a vehicle luggage carrier, a frame for supporting luggage, guide means for the luggage supported upon said frame, supporting brackets arranged in pairs upon opposite sides of a chassis frame directed rearwardly therefrom and removably fixed thereto and said luggage supporting frame being longitudinally adjustable with relation to its supporting brackets and disposed to the rear thereof.

7. The combination with a vehicle chassis frame, of brackets fixed thereto having their ends upturned to serve as luggage guides, a luggage supporting frame embodying side frame members having their rear ends upturned to serve as luggage guides, a cross frame uniting said side frame members, adjustable luggage guides carried by said side frame members, additional supporting brackets fixed to the chassis frame having their rear ends embracingly engaging the rear ends of said first mentioned supporting brackets, said side frame members being connected at their forward ends to permit adjustment of the luggage supporting frame with relation to the supporting brackets and the cross braced section of said supporting frame serving as a luggage carrier being disposed to the rear of said supporting brackets.

8. A luggage carrier for vehicles embodying bracket members fixed to a vehicle chassis and directed rearwardly therefrom, a luggage supporting frame embodying side frame members, cross-brace members and luggage guide members, and said luggage supporting frame being adjustable with relation to said bracket members so as to accommodate luggage of various size.

9. A luggage carrier for vehicles embodying bracket members fixed to a vehicle chassis and directed rearwardly therefrom, a luggage supporting frame embodying side frame members, cross-brace members and luggage guide members, and said luggage supporting frame being adjustable with relation to said bracket members so as to accommodate luggage of various size, said luggage supporting frame being disposed to the rear of said bracket members and means to prevent upward displacement of the luggage carried by said supporting frame.

10. In a luggage carrier, a pair of parallel disposed frame members having their rear ends directed upwardly, cross-bars connecting the frame members near their rear ends and L-shaped adjustable frame members carried by said parallel frame members for constituting a luggage carrier frame, a pair of angular supporting brackets fixed at their forward ends to a chassis frame and having their rear ends embracingly engaging the forward ends of said parallel frame members, a second pair of angular brackets fixed to the chassis frame to the rear of said first mentioned brackets and having their rear ends embracingly engaging the rear ends of said first mentioned brackets, said first mentioned brackets having their rear extremities directed upwardly opposite the upturned ends of the parallel frame members to accommodate luggage therebetween upon the parallel frame members and their bracing members, and means for adjustably connecting the forward ends of the parallel frame members with the rear ends of the aforesaid supporting brackets.

In testimony whereof, I have hereunto signed my name to the specification.

RAYMOND E. BENOIST.